United States Patent
Husband et al.

(10) Patent No.: US 9,300,182 B2
(45) Date of Patent: Mar. 29, 2016

(54) DYNAMO-ELECTRIC MACHINE

(75) Inventors: Stephen Mark Husband, Derby (GB); Alexander Charles Smith, Holmfirth (GB); Paul Tuohy, Stockport (GB)

(73) Assignee: ROLLS-ROYCE plc, London (GB)

( * ) Notice: Subject to any disclaimer, the term of this patent is extended or adjusted under 35 U.S.C. 154(b) by 149 days.

(21) Appl. No.: 13/811,928

(22) PCT Filed: Aug. 2, 2011

(86) PCT No.: PCT/EP2011/063284
§ 371 (c)(1),
(2), (4) Date: Jan. 24, 2013

(87) PCT Pub. No.: WO2012/019943
PCT Pub. Date: Feb. 16, 2012

(65) Prior Publication Data
US 2013/0119800 A1   May 16, 2013

(30) Foreign Application Priority Data

Aug. 10, 2010   (GB) .................................. 1013389.0

(51) Int. Cl.
*H02K 5/132* (2006.01)
*B63H 23/24* (2006.01)
*F03B 13/26* (2006.01)
*H02K 7/14* (2006.01)
*H02K 17/16* (2006.01)
*H02K 21/14* (2006.01)
*B63H 1/16* (2006.01)
(Continued)

(52) U.S. Cl.
CPC ................ *H02K 5/132* (2013.01); *B63H 23/24* (2013.01); *F03B 13/264* (2013.01); *H02K 7/14* (2013.01); *H02K 17/16* (2013.01); *H02K 21/14* (2013.01); *B63H 1/16* (2013.01); *B63H 5/15* (2013.01); *B63H 2005/1258* (2013.01); *B63H 2023/005* (2013.01); *F03B 17/061* (2013.01); *Y02E 10/28* (2013.01)

(58) Field of Classification Search
CPC ....... H02K 5/132; H02K 21/14; H02K 17/16; H02K 7/14; F03B 13/264
USPC ........ 310/87, 156.12, 156.13, 156.14, 156.15
See application file for complete search history.

(56) References Cited

U.S. PATENT DOCUMENTS 5,797,718 A * 8/1998 Gerling et al. ............. 417/44.11

FOREIGN PATENT DOCUMENTS

| CN | 201171178 Y | 12/2008 |
|---|---|---|
| CN | 101707461 A | 5/2010 |

(Continued)

OTHER PUBLICATIONS https://www.nde-ed.org/EducationResources/CommunityCollege/Materials/Introduction/composites.htm.*

(Continued)

*Primary Examiner* — Terrance Kenerly
(74) *Attorney, Agent, or Firm* — Oliff PLC

(57) ABSTRACT

A dynamo-electric machine, for example a marine propulsion unit, includes a stator and a rotor in the form of an impeller. The impeller is rim-driven and includes an annular core of ferromagnetic material, on which are provided layers in the form of an environmental enclosure and electrically conductive sleeves. Appropriate selection of the materials and thicknesses of the layers enables the starting and normal running performance of the machine to be optimized.

13 Claims, 1 Drawing Sheet

Figure 1:
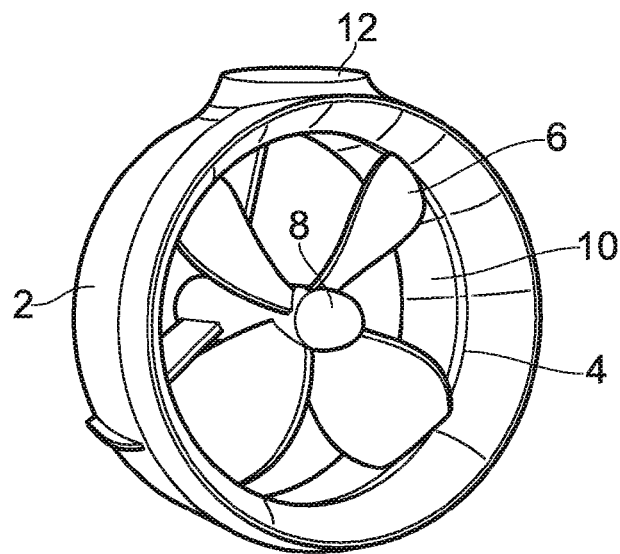

(51) Int. Cl.
*B63H 5/15* (2006.01)
*B63H 5/125* (2006.01)
*B63H 23/00* (2006.01)
*F03B 17/06* (2006.01)

(56) References Cited

FOREIGN PATENT DOCUMENTS

| DE | 1 613 214 | 1/1971 |
|---|---|---|
| EP | 0 566 788 | 10/1993 |
| GB | 2 271 672 A | 4/1994 |
| GB | 2 440 400 A | 1/2008 |
| JP | 54-023903 | 2/1979 |
| JP | A-55-136856 | 10/1980 |
| JP | A-05-236732 | 9/1993 |
| JP | A-2009-290969 | 12/2009 |
| RU | 2 097 901 C1 | 11/1997 |

OTHER PUBLICATIONS

Search Report issued in British Application No. 1013389.0 dated Dec. 1, 2010.
International Search Report issued in International Application No. PCT/EP2011/063284 dated Jun. 5, 2012.
Written Opinion of the International Searching Authority issued in International Application No. PCT/EP2011/063284 dated Jun. 5, 2012.

* cited by examiner

DYNAMO-ELECTRIC MACHINE

This invention relates to a dynamo-electric machine and is particularly, although not exclusively, concerned with such a machine in the form of a marine propulsion unit or a tidal electricity generator.

It is known, for example from GB 2440400, to construct a marine propulsion unit in the form of a rim driven permanent magnetic motor propeller. Typically, a propulsion unit of this kind comprises an impeller having an array of blades fastened between a hub and a rim. The thrust is provided on rotation of the impeller. The impeller constitutes the rotor of an electrical induction motor and comprises a rotor core disposed within a stator of the motor. The stator has a circumferentially distributed series of windings. In accordance with known principles a rotating magnetic field is generated by the windings and induces current flow within the rotor. Interaction between the magnetic fields generated directly by the windings and by induction in the rotor exert a torque on the rotor, causing it to rotate.

Rim driven electric motors tend to have a relatively large internal diameter in order to accommodate the impeller. In order to limit the overall size and weight of the unit, it is desirable for the radial depth of the rim to be minimised. However, reducing the radial depth of the rotor core constituted by, or accommodated within, the rim compromises the performance of conventional line-start induction rotor designs. By "line-start" is meant motors that will self-start when power is applied to the stator windings, without requiring any supplementary components or circuitry to generate the initial movement of the rotor. This problem is addressed in GB 2440400 by using a permanent-magnet motor. However, the installation of permanent magnets on the rotor increases cost, and reduces the robustness of the rotor. Also, there is a finite operational probability that the rotor will fail to synchronise with the rotating magnetic field generated by the stator windings and, should this happen, the motor needs to be disconnected immediately from the power supply to avoid overheating and subsequent failure of the machine.

According to the present invention there is provide a dynamo-electric machine comprising a rotor which is rotatable within a stator provided with stator windings, the rotor comprising an annular core of ferromagnetic material provided with external circumferential layers, the layers comprising an environmental enclosure over its radially outer surface and at least one sleeve of electrically conductive material disposed between the rotor core and the environmental enclosure.

The annular core may be provided with circumferentially distributed electrically conductive rotor bars. For example, the bars may be accommodated in slots within the annular core, and be short-circuited at the axial ends of the annular core, in the manner of a squirrel cage. Alternatively, or in addition, the annular core may be provided with circumferentially distributed permanent magnets so that the machine functions as a permanent magnet machine.

In a machine in accordance with the present invention, the circumferential layers may be tailored to provide desired characteristics of the machine. Thus, the environmental enclosure may be made from an electrically conductive material, so that currents are induced within it when power is supplied to the stator windings, for example to enhance the starting torque of the motor. The resistance of the environmental enclosure may be higher than that of the or each sleeve.

The sleeve, or at least one of the sleeves, may be provided with apertures. The sleeve may be shaped such that the apertures are elongate in form. The apertures may define circumferentially distributed bars extending longitudinally of the respective sleeve.

The layers may comprise at least two sleeves, and may, for example, comprise three sleeves in addition to the environmental enclosure.

The circumferential layers may be of progressively reducing resistance in the radially inwards direction. The difference in resistance between individual layers may result from differences in the radial thickness of the respective layers and/or the resistivity of the material of the respective layers. In an embodiment in accordance with the present invention, the sleeve immediately adjacent the environmental enclosure may be thicker in the radial direction than the environmental enclosure, for example to provide that sleeve with sufficient rigidity to support the environmental enclosure.

The rotor may comprise an impeller or turbine having an array of blades secured to, and extending inwardly of, the annular core.

A dynamo-electric machine in accordance with the present invention may comprise a marine propulsion unit or a turbine for tidal generation, although it will be appreciated that other forms of motor or generator could be constructed in accordance with the present invention.

Figure 2:
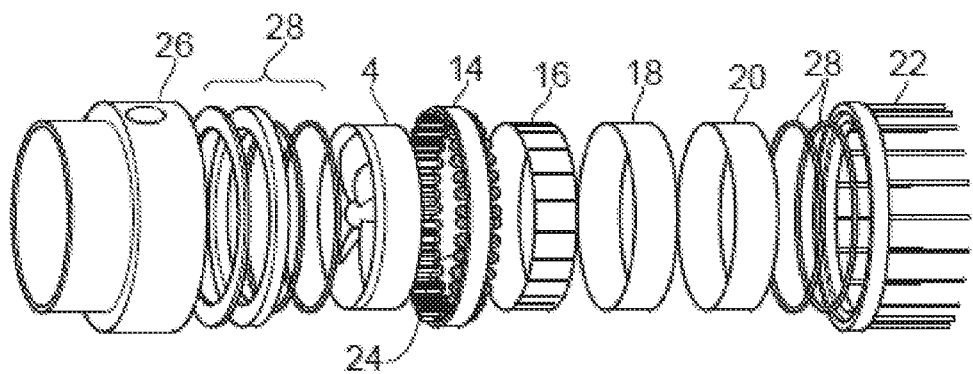

For a better understanding of the present invention, and to show more clearly how it may be carried into effect, reference will now be made, by way of example, to the accompanying drawings, in which:

FIG. 1 shows a marine propulsion unit;
FIG. 2 is an exploded view of the propulsion unit of FIG. 1; and
FIG. 3 is a schematic perspective view of the propulsion unit shown in FIGS. 1 and 2.

The propulsion unit shown in FIG. 1 comprises an outer casing 2 within which an impeller 4 is mounted for rotation. The impeller comprises a circumferential array of blades 6 (four in the illustrated embodiment), which are fixed to, and extend between, a central hub 8 and a rim 10. A pylon 12, shown only partially in FIG. 1, is provided to support the propulsion unit on, or in, the hull of a marine vessel so that the impeller 4, when rotated, provides thrust to propel or manoeuvre the vessel.

The propulsion unit comprises a rim driven dynamo-electric machine, in which the impeller 4 serves as a rotor, while a stator 14 (FIGS. 2 and 3) is accommodated within the outer casing 2. Other components of the propulsion unit shown in FIG. 2 are a series of sleeves or cans 16, 18, 20, supply wiring 22 for coils 24 of the stator 14, an interface component 26 for supporting the stator 14 within the casing 2, and various sealing and other components 28.

Figure 3:
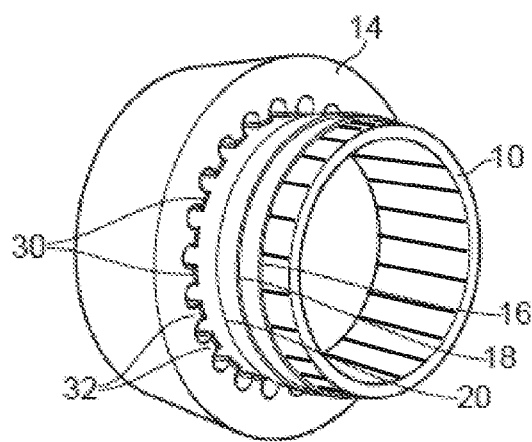

As shown in FIG. 3, the sleeves 16, 18 and 20 form external circumferential layers over the rim 10, which is in the form of an annular core of ferromagnetic material such as iron. Although the sleeves are shown in FIG. 3 as projecting one from the other, this is for purposes of illustration only and in practice the sleeves 16, 18 and 20 terminate at each end at the same axial positions on the core 10, typically at the axial ends of the core 10 so that the core 10 is fully enclosed by the sleeves 16, 18, 20 or at least by the sleeve 20. The sleeve 20 serves as an environmental enclosure, and its prime function is to protect the annular core 10 from the surroundings which, when the propulsion unit is used in a marine vessel, would be sea water. Similarly, the stator 14 has an encapsulation layer 30 to protect the stator core from the surroundings. It will be appreciated from FIG. 14 that the stator has circumferentially distributed inwardly directed projections 32 on which the windings 24 (not shown in FIG. 3) are situated.

The sleeves 16, 18, 20 may be made from any suitable material. The environmental enclosure 20 may be electrically conductive but is not necessarily so. It may, for example, be made from a composite material. The inner sleeves 16, 18 need to be electrically conductive, and may be made from a metal or metal alloy such as steel or copper. They may be fitted to the annular core 10 by heat shrinking.

The annular core 10 may be a simple homogenous hollow cylinder, as represented in FIG. 3, but in other embodiments it may be provided with longitudinally extending grooves (possibly with a helical twist to them) for receiving conductors, such as cooper bars, which may be short-circuited (i.e. electrically interconnected) at the opposite axial ends of the core 10. Furthermore, the core 10 may be provided with circumferentially distributed permanent magnets.

In a preferred embodiment, the environmental enclosure 20 is electrically conductive, but its resistance is greater than that of the inner two sleeves 16, 18. The resistance of the sleeve 18 may be greater than that of the sleeve 16. It will be appreciated that the resistance of each layer 16, 18, 20 will be a function of its resistivity, thickness and length. Consequently, the differences in electrical resistance may be achieved, for example, by appropriate selection of the materials from which the sleeves 16, 18 and 20 are made. For example, the environmental enclosure 20 may be made from a material with a high resistivity, while the materials of the sleeves 16 and 18 may be made from materials with low resistivity. Differences in electrical resistance may also be achieved by varying the thickness, in the radial direction with respect to the axis of rotation of the impeller 4, of the sleeves 16, 18 and 20. Thus, a higher electrical resistance can be achieved by reducing the radial thickness of the respective sleeve 16, 18, 20.

An important function of the environmental enclosure 20 is to prevent penetration of sea water from the surroundings to the annular core 10. Consequently, its material is preferably selected to resist corrosion and to provide a good seal with adjacent components.

One or both (and preferably the innermost one) of the sleeves 16, 18 within the environmental enclosure 20 may be provided with apertures or slots (not shown in the Figures) which give the respective sleeve 16, 18 a configuration which, in operation, achieves a desired distribution of rotor electrical currents. For example, the respective sleeve 16, 18 could have a configuration similar to that of a squirrel cage (i.e. with axial end rings interconnected with longitudinally extending bars) which would cooperate with the annular core 10 to provide a squirrel-cage rotor effect.

In operation of an induction motor of the kind shown in the Figures, current is supplied to the windings 24 of the stator 14 in a controlled manner to generate a rotating magnetic field within the stator 14. This rotating magnetic field induces current flow within the annular rotor 10, and in the sleeves 16, 18, 20 (if made of an electrically conductive material). The magnetic fields of the stator and the rotor interact with each other to cause the rotor to rotate.

The electrical currents induced in the rotor are induced by the change in the stator magnetic field as this magnetic field rotates about the rotor axis. When the rotor is stationary, the change in the magnetic field is greatest and high EMFs are induced in the rotor.

Furthermore, it is known that an AC current flowing in a conductor distributes itself preferentially at the surface of the conductor in a phenomenon known as the "skin effect". The skin effect causes the effective resistance of the conductor to increase as the frequency of the AC current increases, i.e. as the speed difference between the stator magnetic field and the rotor increases.

By using a conductive outer layer, in the form of the environmental enclosure 20, having a high electrical resistance, the skin effect is enhanced, and this results in a high torque being generated on starting of the motor.

As the rotor speed increases, the relative frequency between the stator and the rotor decreases, and the skin effect reduces. The rotor current flows preferentially in the inner sleeves 16, 18 and the core 10. Since these have a relatively low effective resistance, the machine operates at relatively high efficiency with a high power factor when running at or close to its rated speed.

By appropriate selection of the resistivity of the materials of the sleeves 16, 18 and 20, of their thickness, and of the configuration of any apertures or slots in either or both of the sleeves 16, 18, a desired characteristic for the machine can be developed in terms of the torque generated on starting, and the efficiency at normal running speed.

In a typical specific embodiment, the environmental enclosure 20 may have a resistivity of $50 \times 10^{-8}$ to $100 \times 10^{-5}$ $\Omega \cdot m$ and a thickness of 0.25 mm to 0.75 mm, for example about 0.5 mm. A suitable material is stainless steel, typically having a resistivity of $72 \times 10^{-8}$ $\Omega \cdot m$. Stainless steel provides a mechanically robust and corrosion resistant outer layer, while presenting the electrical system with a high resistance, particularly at start-up when high torque is achieved with a low starting current.

The outer sleeve 18 of the specific embodiment may have a resistivity of $2.5 \times 10^{-8}$ to $3 \times 10^{-8}$ $\Omega \cdot m$ and a thickness of 0.75 to 1.25 mm, for example about 1 mm. A suitable material is aluminium, or an aluminium alloy. Aluminium has a resistivity of $2.5 \times 10^{-8}$ $\Omega \cdot m$. The principal function of the outer sleeve 18 is to provide the ability to maintain high torque starting with a low starting current, once the rotor 10 has begun to turn. In addition, the outer sleeve 18 provides mechanical support to the environmental enclosure 20. The outer sleeve 18 may also provide damping when the motor is functioning at its rated speed.

In the specific embodiment, the inner sleeve 16 may have a resistivity below $2 \times 10^{-8}$ $\Omega \cdot m$ and a thickness of 1.5 mm to 2.5 mm, for example about 2 mm. The inner sleeve may be made of copper, having a resistivity of $1.68 \times 10^{-8}$ $\Omega \cdot m$. The inner sleeve 16 provides the majority of the electro-mechanical work at the rated speed of the motor. Using copper, or another material with low resistivity, results in minimal losses, so increasing efficiency, and in minimal slip between the rotor 10 and the rotating magnetic filed of the stator 14.

The environmental enclosure 20 and the outer sleeve 18 may be solid, i.e. continuous about their circumference. The inner sleeve 16 may be slit in the longitudinal direction, possibly with some axial skew, over about 80% of the length of the sleeve. The end regions of the inner sleeve 16 remain continuous to short-circuit the bars left between the slits.

The annular core 10 may be in the form of a laminated ring of magnetic steel. Lamination reduces rotor iron losses, but in other embodiments the annular core 16 may be solid.

The use of metallic materials for the layers 16, 18, 20 provides a good thermal connection between the layers, improving heat dissipation.

It will be appreciated that the above specific embodiment is given by way of example only, and that other materials, resistivities and thicknesses may be employed. For example, bronze, with a resistivity of $10 \times 10^{-8}$ to $20 \times 10^{-8}$ $\Omega \cdot m$ may be used, particularly for the environmental enclosure 20.

Embodiments in accordance with the invention provide electrical machines which can operate with high efficiency and a high power factor while having a rotor of relatively small radial thickness. Also, because the environmental enclosure 20 is made from a material selected primarily on the basis of its environmental protection capabilities, the present invention enables the use of a sleeve, such as the sleeve 18, disposed immediately inwardly of the environmental enclosure 20 to provide additional starting capability, so reducing the work undertaken by the environmental enclosure 20. The use of additional sleeves 16, 18 also enables the thickness of the environmental enclosure 20 to be reduced, saving weight and allowing machine optimisation.

It can be discerned by the skilled person that a particular design requirement for the above-described embodiments is to achieve a high rotor resistance at start and low rotor resistance at rated conditions. Accordingly it may be considered to be a characterising advantage of the invention that a relatively higher rotor resistance is achieved for a first mode of operation—such as, for example, a start-up condition—and a relatively lower resistance is achieved for a second mode of operation—such as, for example, at normal or rated operational conditions. However it is to be stressed that the design of the sleeves can be tailored to meet other requirements, such as, for example, that of optimum performance.

Although it is not essential for the annular core 10 to be provided with internal rotor bars, such rotor bars, for example of circular or rectangular cross-section, could be incorporated in some embodiments. Similarly, the principles of the present invention could also be applied to permanent magnet motors in which the annular rotor 10 is provided with circumferentially distributed permanent magnets.

Although the invention has been described primarily in terms of a dynamo-electric machine in the form of a marine propulsion unit, it will be appreciated that the principles underlying the invention can be applied to other forms of electric motor, and also to electric generators such as tidal generation units.

The invention claimed is:

1. A dynamo-electric machine comprising:
    a stator having a plurality of stator windings; and
    a rotor configured to rotate within the stator, the rotor including:
        an annular core of ferromagnetic material having a rim circumferentially disposed on a radially outer side of the annular core; and
        a plurality of external circumferential layers disposed radially outward of the rim, the plurality of layers including:
            an environmental enclosure made of an electrically conductive material, the environmental enclosure being an outermost layer of the plurality of layers, and
            at least one sleeve made of an electrically conductive material, the at least one sleeve being disposed between the rim of the rotor core and the environmental enclosure;
        wherein an electrical resistance of the environmental enclosure is higher than an electrical resistance of the at least one sleeve.

2. The machine according to claim 1, wherein the annular core is provided with circumferentially distributed electrically conductive rotor bars.

3. The machine according to claim 1, wherein the annular core is provided with circumferentially distributed permanent magnets.

4. The machine according to claim 1, wherein the at least one sleeve is provided with apertures.

5. The machine according to claim 4, wherein the apertures define circumferentially distributed bars extending longitudinally of the respective sleeve.

6. The machine according to claim 1, wherein the layers include at least two sleeves of electrically conductive material.

7. The machine according to claim 1, wherein the layers are of progressively reducing electrical resistance in the radially inwards direction.

8. The machine according to claim 7, wherein the difference in electrical resistance between the layers results from differences in the radial thicknesses of the respective layers and/or the resistivity of the material of the respective layers.

9. The machine according to claim 1, wherein the at least one sleeve immediately adjacent the environmental enclosure is radially thicker than the environmental enclosure.

10. The machine according to claim 1, wherein the rotor further includes an impeller or turbine having an array of blades secured to and extending inwardly of the annular core.

11. A dynamo-electric machine in accordance with claim 1 which is a marine propulsion unit.

12. A dynamo-electric machine as claimed in claim 1 which is a turbine for tidal generation.

13. The machine according to claim 1, wherein the plurality of layers has an identical axial length in an axial direction of the rotor.

* * * * *